United States Patent [19]

Hill et al.

[11] Patent Number: 4,876,530
[45] Date of Patent: Oct. 24, 1989

[54] METHOD AND APPARATUS FOR DETECTING LEAKAGE IN FUEL STORAGE AND DELIVERY SYSTEMS

[75] Inventors: Wayne E. Hill, Bucyrus, Kans.; Dennis McEachern, Concord, N.C.

[73] Assignee: The Marley Company, Mission Woods, Kans.

[21] Appl. No.: 108,275

[22] Filed: Oct. 13, 1987

[51] Int. Cl.⁴ .................. G01M 3/26; G08B 21/00
[52] U.S. Cl. .................... 340/605; 73/49.2; 73/49.1
[58] Field of Search .............. 73/40.5 R, 40, 49.1, 73/49.5, 49.2; 364/479, 550, 558; 340/605, 603, 604; 379/40

[56] References Cited

U.S. PATENT DOCUMENTS

| | | | |
|---|---|---|---|
| 2,928,247 | 3/1960 | Hubbell | 73/40.5 R |
| 2,952,389 | 9/1960 | Fowler et al. | |
| 2,952,390 | 9/1960 | Fowler et al. | |
| 2,979,939 | 4/1961 | Shuh | 73/40.5 R |
| 3,183,723 | 5/1965 | Deters | |
| 3,261,201 | 7/1966 | Pottash | |
| 3,273,753 | 9/1966 | Johnson et al. | |
| 3,350,704 | 10/1967 | Kessler | |
| 3,439,837 | 4/1969 | Hearn et al. | |
| 3,454,195 | 7/1969 | Deters | |
| 3,505,513 | 4/1970 | Fowler et al. | |
| 3,664,357 | 4/1974 | Kreiss | |
| 3,692,050 | 11/1975 | Deters | |
| 3,738,531 | 6/1973 | Mitchell | |
| 3,788,127 | 1/1974 | Marsh | |
| 3,866,798 | 2/1975 | Marsh | |
| 3,940,020 | 2/1976 | McCrory et al. | |
| 3,958,449 | 5/1976 | Drescher et al. | |
| 3,966,088 | 6/1976 | Reynolds | |
| 4,012,944 | 3/1977 | Covington et al. | |
| 4,088,985 | 5/1978 | Saito et al. | 340/605 |
| 4,088,987 | 5/1978 | Resler et al. | |
| 4,116,044 | 9/1978 | Garrett | |
| 4,131,216 | 12/1978 | Gerstenmaier et al. | |
| 4,144,743 | 3/1979 | Covington et al. | |
| 4,308,746 | 1/1982 | Covington | |
| 4,338,812 | 7/1982 | Lindgren | |
| 4,397,405 | 8/1983 | Batson | |
| 4,404,842 | 9/1983 | Mooney | |
| 4,410,109 | 10/1983 | Murrell et al. | |
| 4,496,077 | 1/1985 | Zuehlsdorf | |
| 4,586,033 | 4/1986 | Andrejasich | 340/603 |
| 4,608,857 | 9/1986 | Martens et al. | 73/49.1 |
| 4,644,354 | 2/1987 | Kidd | 73/49.2 X |
| 4,658,986 | 4/1987 | Freed et al. | 73/40.5 R |
| 4,712,097 | 12/1987 | Hashimoto | 379/40 |
| 4,715,214 | 12/1987 | Tveter et al. | 73/40 |
| 4,721,950 | 1/1988 | Andrejasich et al. | 340/603 |

FOREIGN PATENT DOCUMENTS

27041  2/1983  Japan .............................. 73/40.5 R

*Primary Examiner*—Hezron E. Williams
*Attorney, Agent, or Firm*—Kokjer, Kircher, Bradley, Wharton, Bowman & Johnson

[57] ABSTRACT

A microprocessor based system for detecting leaks from underground gasoline storage tanks and the product lines through which the gasoline is pumped to above ground dispensers. Hydrocarbon sensitive probes spaced around the tank in monitoring wells detect gasoline leakage from the tank. Each probe can be independently programmed as to the threshold hydrocarbon concentration considered to be indicative of a leak. Pressure transducers sense the product line pressure and distinguish thermally induced contraction from true leaks by comparing the time required for a preselected pressure drop to occur during successive cycles. A time comparison is also used to detect the presence of excessive air in the product line. An alarm condition sensed by either type of sensor generates audible and visible alarm signals and automatically dials a programmed telephone number. The alarm times and dates are stored in memory and may be called up on the display screen.

32 Claims, 9 Drawing Sheets

METHOD AND APPARATUS FOR DETECTING LEAKAGE IN FUEL STORAGE AND DELIVERY SYSTEMS

BACKGROUND OF THE INVENTION

This invention relates in general to the detection of liquid leakage and deals more particularly with the detection of leakage from underground fuel storage tanks and the delivery lines through which the fuel is pumped for dispensing.

In gasoline service stations, it is common practice for automotive fuel to be stored in large underground tanks from which it is pumped through product lines to various types of dispensers. Typically, the dispenser is a pedestal equipped with a dispensing nozzle and a switch which is turned on to open a solenoid valve that permits the fuel to be dispensed. The nozzle is provided with a hand operated valve which opens and closes the nozzle to control the dispensing of fuel. Each pedestal may have a number of different nozzles and switches for dispensing different types of fuels such as regular gasoline, unleaded gasoline, diesel fuel, and one or more premium fuel grades.

The fuel is pumped from the storage tank to the dispenser by a submersible pump which is activated when the dispenser switch is turned on and deactivated at the end of the dispensing operation. Normally, a check valve is incorporated in the pump assembly so that at the end of a dispensing cycle, the product line retains the fuel that has been pumped into it, thus permitting the gasoline to be delivered immediately at the start of the next dispensing cycle. A pressure relief valve built into the pump assembly is used to relieve the product line pressure to a level of 11-15 psi following the end of each dispensing cycle.

Because of the positive pressure that is maintained in the product line, any leaks in the piping between the check valve and the dispenser can result in significant amounts of fuel leaking from the product line and contaminating the subsoil and groundwater. In addition, leaks in the underground tank can develop and result in the loss of considerable amounts of fuel into the ground. Such leaks have been of increasing concern in recent years due in part to the significant monetary losses that can be incurred due to the leakage of increasingly higher priced fuels. Perhaps even more importantly, the increasing emphasis that has been placed on environmental concerns in recent years has prompted industry standards and proposed laws and regulations that limit the amount of leakage that is considered acceptable.

The problem of tank leakage can be dealt with by using a double wall tank in a so called secondary containment system. The second or outer container serves the purpose of confining any fuel that may leak from the primary tank. However, the expense of a double wall tank is considerably greater than that of a single tank, and it is economically impractical in most situations to replace an existing single tank installation with a double wall tank. Dealing with leakage from the product lines presents in many ways an even more difficult problem, due largely to the difficulty that is involved in detecting leakage from the product line. The approaches that have been taken in the past to the detection of leaks in pressurized piping have generally relied on monitoring of the pressure in the system and interpreting large pressure drops as being caused by a leak in the piping. However, thermal effects can be and often are influential enough to create pressure drops that give false leak indications. For example, if relatively warm gasoline is pumped into a cold discharge pipe, the liquid undergoes a thermally induced volume contraction which can reduce the pressure in the pipe significantly even though there is no leakage of fluid. Consequently, unless a detector is able to distinguish pressure losses caused by a leak from those caused by thermal contraction, it will not be able to reliably detect a true leak in the piping system.

The problem of distinguishing between thermal contraction and actual leakage is compounded by the many variables that influence thermal decay. Among these variables are the gasoline blends and seasonal blend changes, the gasoline temperature when delivered to the underground tank, the speed with which the tank is depleted, the characteristics of the discharge piping such as its material, size, length and number of parallel lines, the type of back fill materials around the pipes, the groundwater level, the presence or absence of air in the product lines, and the ground temperature as effected by the climate, season, weather patterns, station pad material and the presence or absence of shading. Because of the uncertainties caused by the possible variations in these and other factors that can effect the thermal response of the liquid in the system, there have been no leak detectors available in the past that have been able to successfully distinguish between thermal contraction and leakage in order to provide reliable detection of true leaks.

SUMMARY OF THE INVENTION

The present invention is directed to a method and apparatus which reliably detects leakage from underground fuel tanks and also from the pressurized product lines that deliver the fuel to the dispensers. In detecting leakage from the product lines, special measures are taken to distinguish thermal contraction from true leakage, and the ability to make this distinction in a reliable manner eliminates the problem of false alarms caused by thermal contractions that are erroneously interpreted as leaks. The distinction between thermally induced contraction and actual leakage is made in the present invention by relying upon the physical fact that the pressure or volume decay caused by thermal contraction decreases with time, whereas the volume decay caused by a leak does not.

In accordance with a preferred embodiment of the invention, a spring loaded piston operates in a fluid reservoir which supplies make up fluid in the event of volume loss when the pump is off. The working range of the piston is about 4-11 psi. A pressure relief valve in the pump assembly relieves the line pressure to approximately 12 psi when the pump shuts off at the end of a dispensing cycle. The line pressure is monitored by a pressure transducer which provides an electrical output signal as an input to the electronic components of the leak detecting system. If the pressure in the product line drops, the reservoir supplies a small amount of make up liquid (up to 5 cubic inches in the preferred embodiment). If the pressure drops to 10 psi, a timing cycle is initiated and a measurement is made of the time required for the pressure to drop from 10 psi to 5 psi. If this time is 8 seconds or less, the pressure drop is too rapid to be caused by thermal contraction and a leak is indicated. Accordingly, the system immediately goes into the alarm mode and disables the pump. However, if the measured time is greater than 8 seconds, the pressure drop can be due to either a leak or to thermal contraction. Then, the time is recorded and the pump is turned on for a short cycle (3-5 seconds) to raise the line pressure back above 12 psi and fill the reservoir again.

If the pressure again drops to 10 psi, a second timing cycle is initiated and the time it takes the pressure to drop from 10 psi to 5 psi is again measured. If the pressure drop is due to thermal contraction, the time measured for the second cycle will be significantly greater than the first cycle time because the thermal effects stabilize over time. However, the time for the second cycle will be substantially equal to the time for the first cycle if a leak is the cause for the pressure drop. Consequently, the times for successive cycles are compared and an alarm condition results if the time does not increase significantly from any one cycle to the next. An alarm condition causes the pump to be disabled and generates both an audible and a visible alarm.

Another significant feature of the invention is its ability to detect the presence of excessive air in the product line. This is important because air provides "false storage" of liquid and has an adverse effect on the ability to distinguish thermally induced contraction from true leaks. If no air or only minimal air is present in the product line, the relief valve is able to almost immediately relieve the line pressure from the pump shut off pressure (20-35 psi) to the relief valve pressure of 12 psi. However, if air is present in the product line, it compresses when the pump is on and increases the time required for the pressure to drop. In the present invention, this physical fact is used to detect excessive air. The time is measured from pump shut off to achievement of 15 psi, and if the time exceeds two seconds, excessive air is indicated and the station manager is alerted to that fact so that remedial measures can be taken.

The preferred embodiment of the invention used microprocessor based technology, in large part because it provides considerable flexibility and allows hydrocarbon probes to be used alone or together with one or more line leak detectors. The probes may be placed either between the walls of a double wall tank or in monitoring wells spaced around the tank. Each probe can be individually and independently assigned a threshold hydrocarbon concentration that, when exceeded, indicates that fuel is leaking from the tank. This field programmability of the probes allow each probe to operate with a different threshold level and permits the station management to program the threshold levels in a manner to compensate for any local peculiarities such as local ordinances or high existing background levels of hydrocarbon. Consequently, in each installation, each probe can be set at a threshold level that takes into account all of the factors that should be considered if a true leak from the tank is to be detected.

An additional feature of the invention is the informative liquid crystal display that provides the station management with information as to the status of each product line and each probe. By scanning the display, the hydrocarbon concentration in parts per million (ppm) at each probe is given, and the pressure in each line is also displayed (in psi). The memory of the system records the time and location of all alarm conditions, and this information can be called up and displayed on the screen upon command. The leak detection system is also provided with remote communications capabilities. This feature allows a preselected telephone number to be automatically dialed in the event of an alarm condition or on a periodic basis to provide periodic status reports. Additionally, remote programming, resetting and monitoring of the system status is possible via telephone.

The leak detector is also constructed in a manner allowing it to be easily installed, both in newly constructed pumping systems and in existing systems which can be retrofit without significant difficulty.

DESCRIPTION OF THE DRAWINGS

In the accompanying drawings which form a part of the specification and are to be read in conjunction therewith and in which like reference numerals are used to indicate like parts in the various views:

FIGS. 4a-4f are schematic diagrams of the electronic circuitry included in the leak detector;

FIG. 4g is an organizational diagram indicating the manner in which FIGS. 4a-4f are arranged relative to one another;

FIG. 6 is a schematic diagram of the electronic circuitry which reduces the power consumption in the event of a loss of AC power;

DETAILED DESCRIPTION OF THE INVENTION

Figures 1, 2:
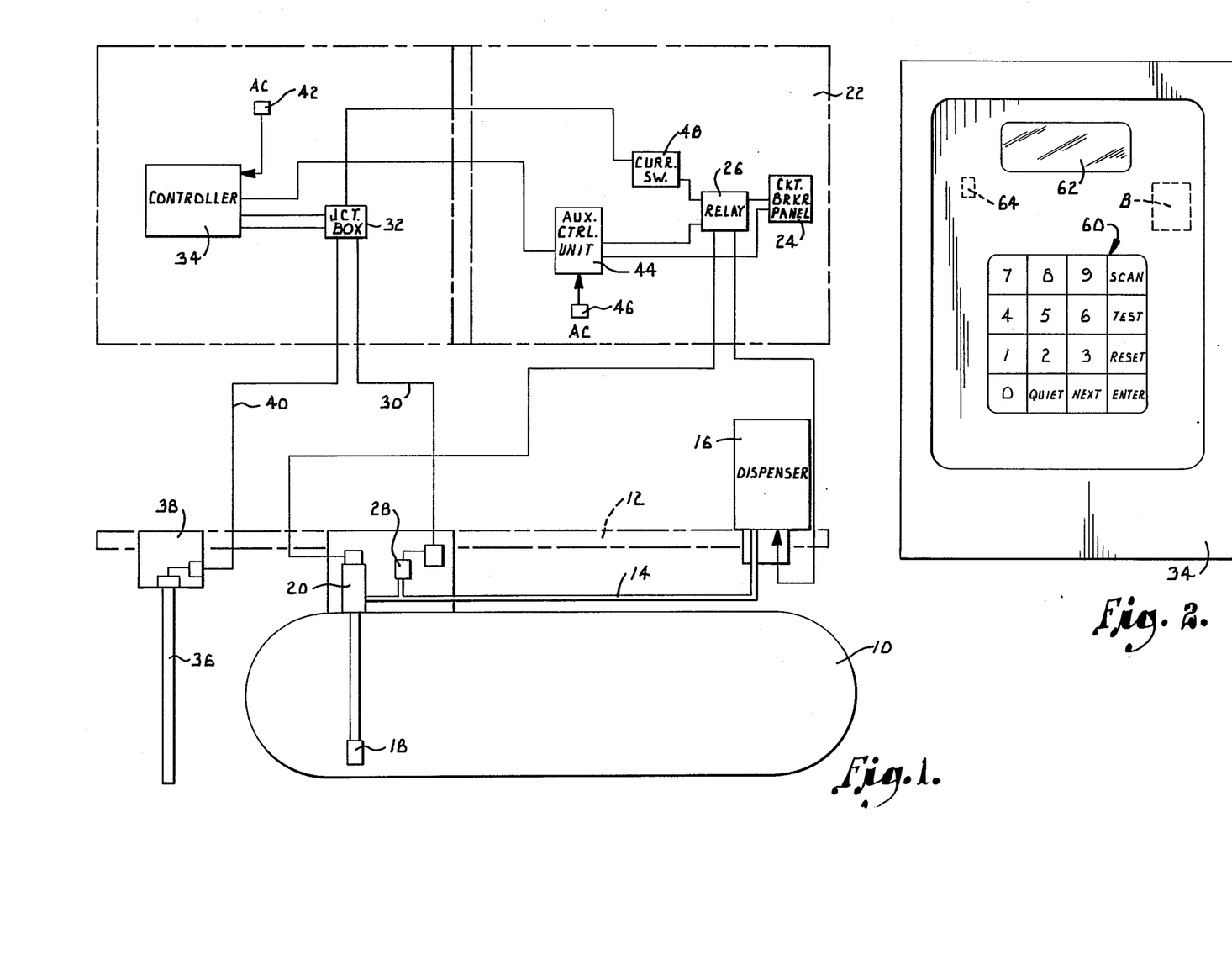
FIG. 1 is a diagrammatic view of a fuel storage and delivery system which is equipped with a leak detector constructed according to a preferred embodiment of the present invention.
FIG. 2 is a front elevational view of the face of the control box included in the leak detector.

Referring now to the drawings in more detail and initially to FIG. 1, the present invention is directed to a method and apparatus for detecting the leakage of automotive fuel from a storage and distribution system of the type commonly found in gasoline service stations. The fuel is stored in a large underground tank 10 which is buried beneath a concrete slab 12 located substantially at ground level. A product line 14 extends from the underground tank 10 to a dispenser 16 which is mounted on slab 12 and is typically a pedestal type dispenser. A submersible pump 18 operates to pump the fuel through the product line 14 to the dispenser 16. The pump 18 is driven by an electric motor in a conventional manner. A pump discharge head 20 is located exteriorly of the storage tank 10 and receives liquid from the pump and provides it to the product line 14. Normally, the discharge head 20 and pump 18 are accessible through an access well (not shown) which is covered by a suitable cover.

The electrical controls for the submersible pump 18 are located within the service station building 22 and more particularly within a restricted "back room" area which is generally not accessible to the public. These controls include a main circuit breaker panel 24 which receives and distributes the AC power. A pump motor relay 26 receives power from the panel 24 and is wired to the switch on the dispenser 16 and to the pump 18.

In accordance with the present invention, a pressure transducer 28 has a tee connection with the product line 14 in order to sense the product line pressure. The pressure transducer 28 senses the product line pressure and provides an electrical output signal which is proportional to the sensed pressure. The electrical signal is provided on line 30 to a junction box 32 which may be located in the main sales area of the service station building 22. The signal provided by the pressure transducer 28 provides a measure of the pressure it senses, and this signal is applied from the junction box to a microprocessor based controller 34.

One or more hydrocarbon sensitive probes such as that diagrammatically indicated at 36 are located near the underground tank 10 in order to sense hydrocarbon leakage from the tank. Although only one probe 36 is shown in FIG. 1, it is to be understood that a plurality of probes are normally provided at spaced locations around the tank 10. Each probe 36 is mounted in a below ground monitoring well 38. Each probe 36 provides an electrical output signal which is indicative of the concentration of hydrocarbons sensed by the probe (in parts per million or ppm). The electrical signal from each probe 36 is provided via line 40 to the junction box 32 and from the junction box to the controller 34.

The controller 34 is powered by a transformer 42 which accepts available AC power. The controller is connected with an auxiliary control unit 44 which controls the pump motor relay 26 and various auxiliary devices such as remote alarms and blowers in the event of an alarm condition. The auxiliary control unit 44 receives power from a transformer 46 which accepts available AC power. The controller 34 connects through the junction box 32 with a current operated switch 48 which is in turn wired to the pump motor relay 26.

Figure 3:
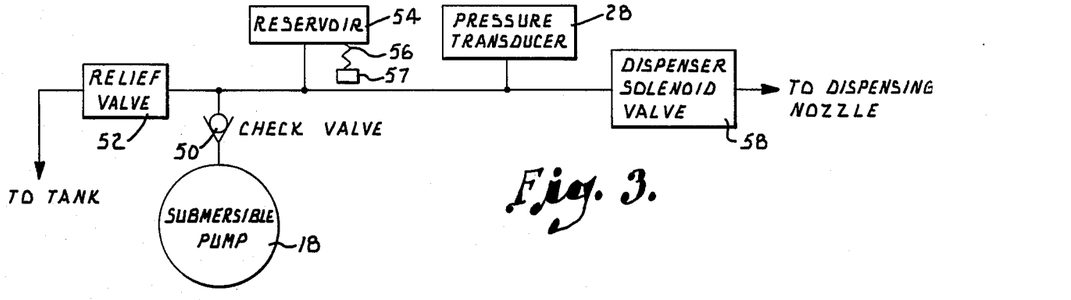
FIG. 3 is a diagrammatic view of the components in the hydraulic system associated with the line leak detector.

The hydraulic components associated with the line leak detection capability of the invention are illustrated diagrammatically in FIG. 3. A check valve 50 prevents liquid from the product line 14 from draining back into the tank when the submersible pump 18 is shut off. The pumping assembly has an integral relief valve 52 which relieves the pressure in the product line to 12 psi (or another selected pressure) when the pump is shut off. A piston type reservoir 54 is located between the check valve 50 and the pressure transducer 28. The reservoir 54 provides a small storage volume which receives liquid from the product line 14 when the pump 18 is on. A spring 56 acts against a piston 57 in a manner to eject liquid from the reservoir 54 into line 14 whenever the pressure in line 14 drops low enough so that the spring 56 is able to overcome the line pressure. The spring 56 is preferably selected such that liquid in the reservoir 54 is injected into the product line 14 whenever the line pressure is between about 4 and 11 psi. At 11 psi, the piston begins to eject liquid from the reservoir, and at 4 psi, the reservoir is depleted. The product line 58 also includes a dispenser solenoid valve which is normally closed to block line 14 but which is opened when the switch on the dispensing nozzle served by the product line is turned on.

Although FIGS. 1 and 3 depict only a single product line and a single dispenser, it is to be understood that the tank 10 may serve a plurality of product lines arranged in parallel and that any one product line may serve more than one dispenser. In addition, a service station ordinarily includes a plurality of tanks each containing a different type of fuel such as regular gasoline, lead free gasoline, various premium grades of gasoline and diesel fuel. Each dispenser may be capable of dispensing any one type of fuel or all types of fuel from different dispensing nozzles.

FIG. 2 shows the front face of the boxlike enclosure which houses the electronic components of the microprocessor based controller 34. A key pad 60 is provided on the front face of the control box and includes a number of keys, including keys which represent the digits 0–9. Also included is a scan key, a test key, a reset key, an enter key, a next key, and a quiet key, all labeled as indicated in FIG. 2. A liquid crystal display 62 is included above the key pad of the control box and is visible through a display window. The control box is ordinarily mounted in the sales area of the service station building 22 where the key pad and display are accessible to station personnel. A program switch 64 is mounted inside of the enclosure, preferably on the backside of a cover door which provides the display 62 and key pad 60 on its front surface. The cover can be locked in the closed position and opened only by authorized personnel having access to a key for the cover.

Figures 4A, 4G:
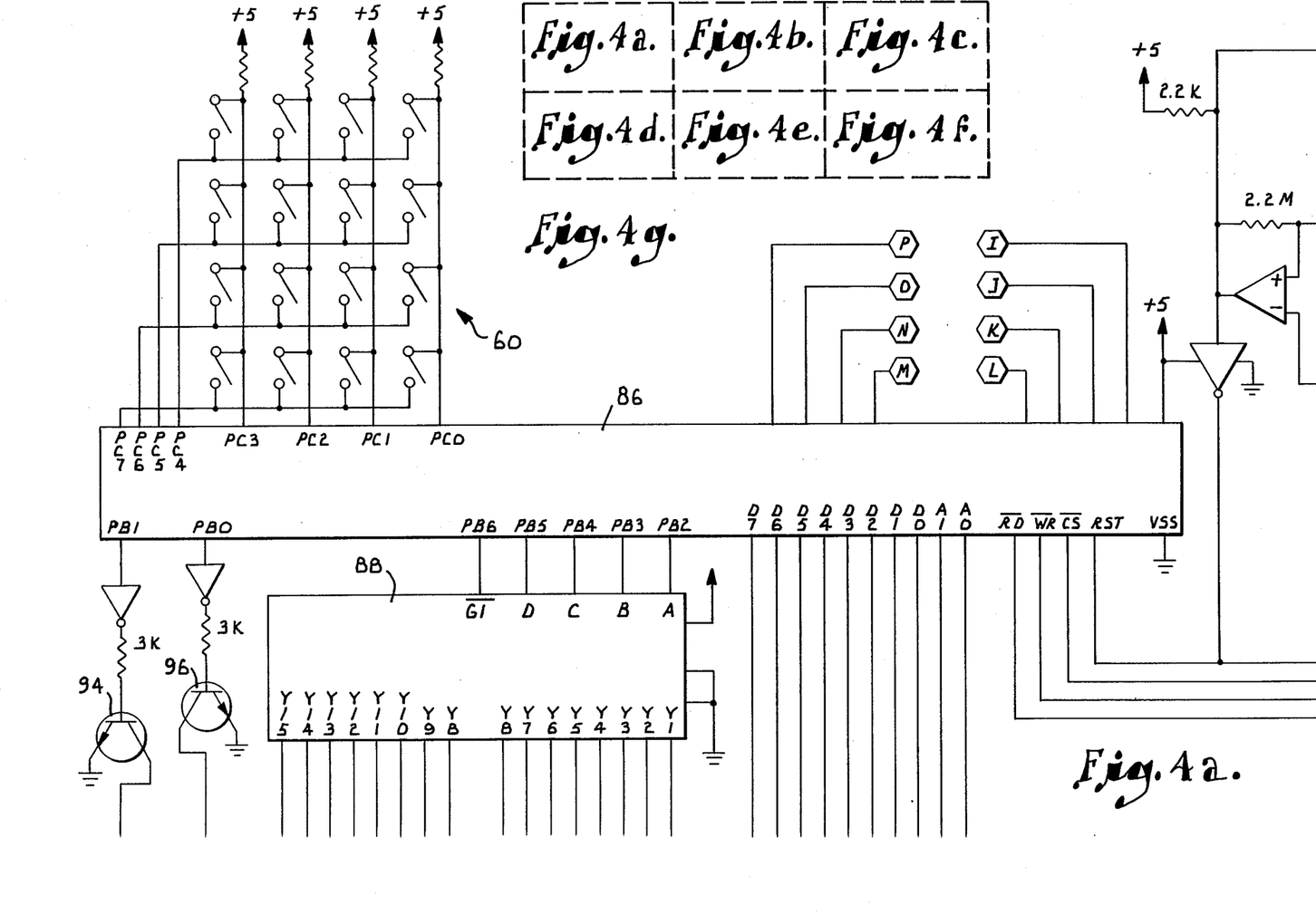
Figure 4B:
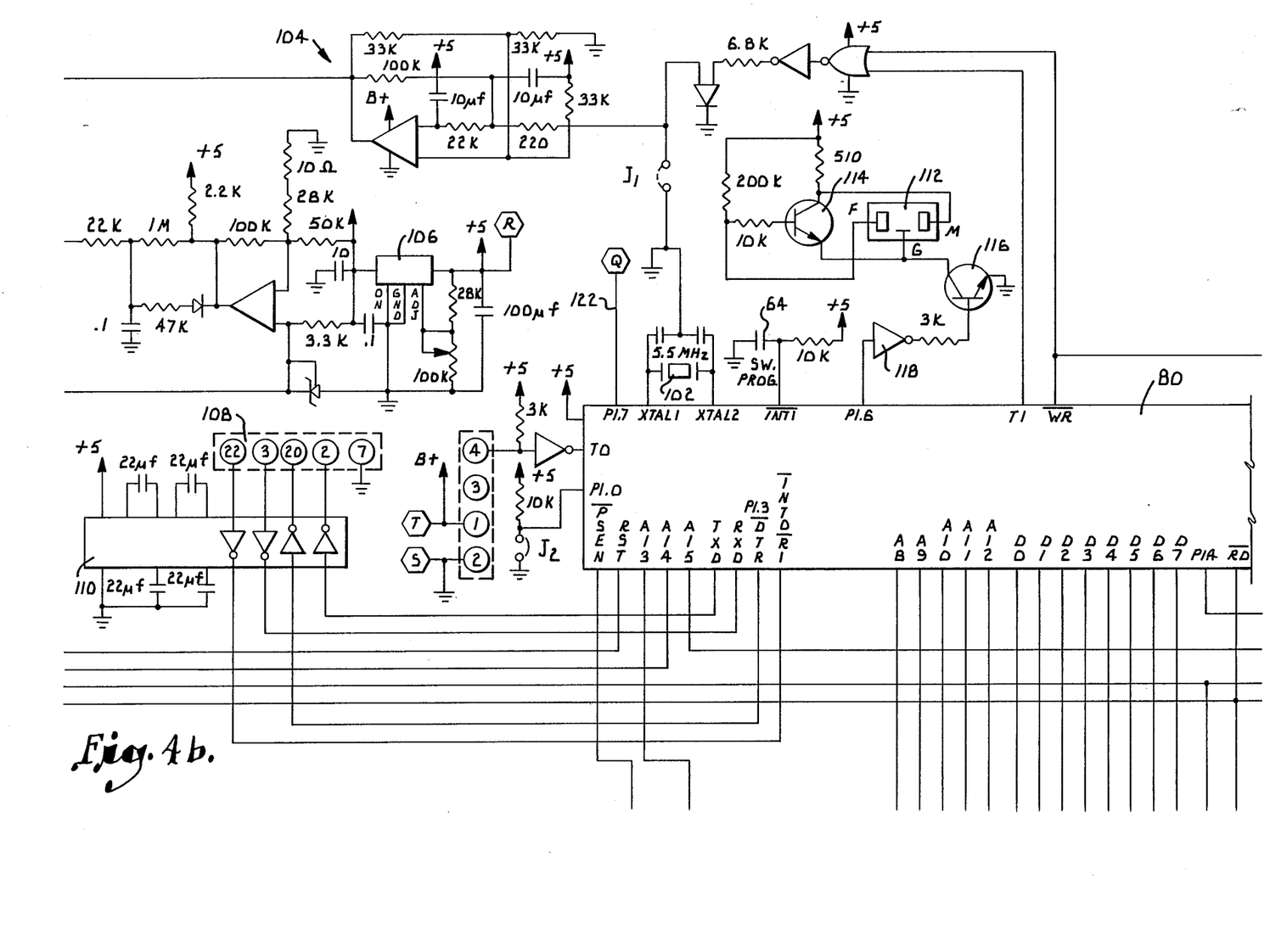
Figure 4C:
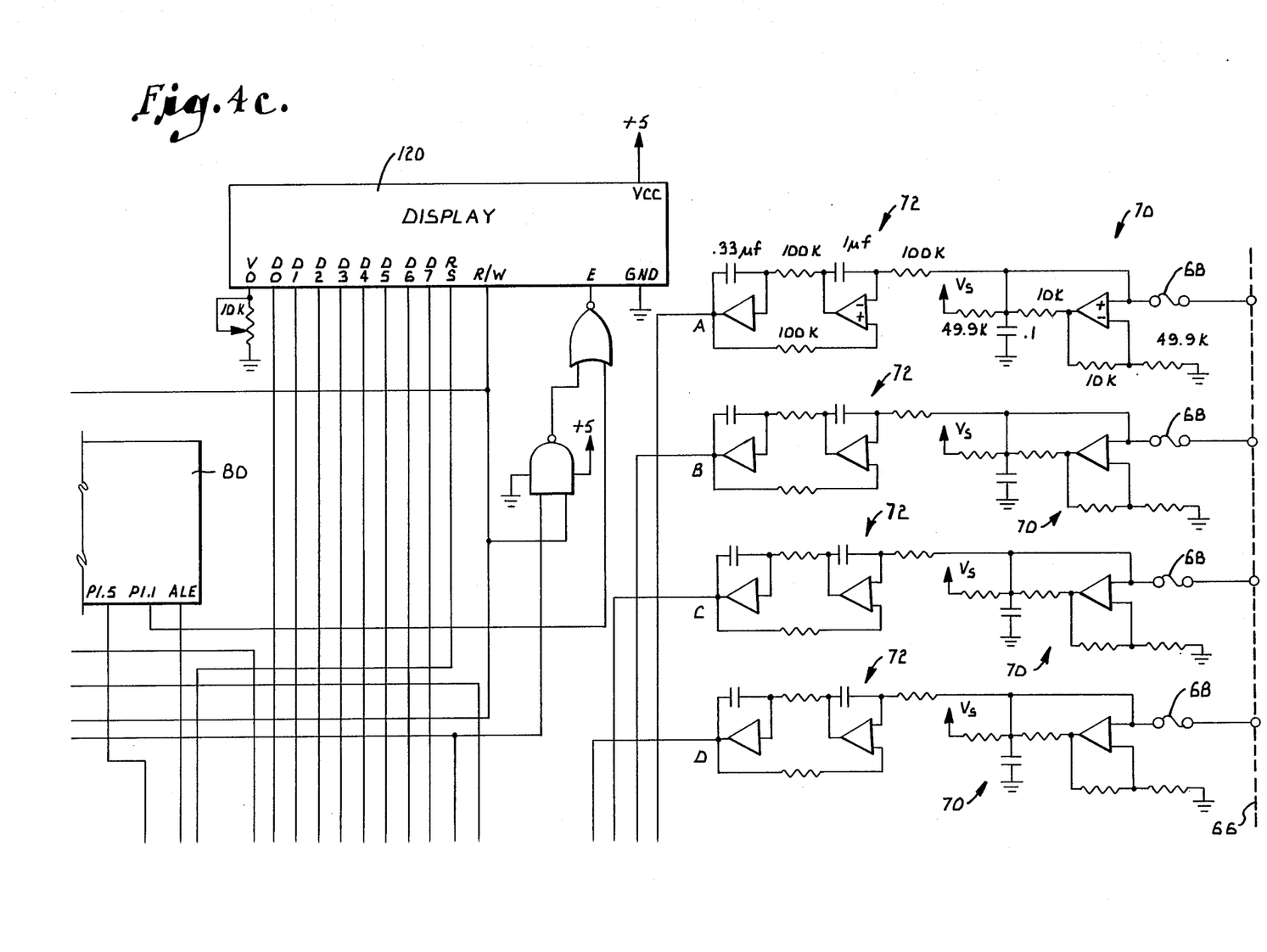
Figures 4D, 6:
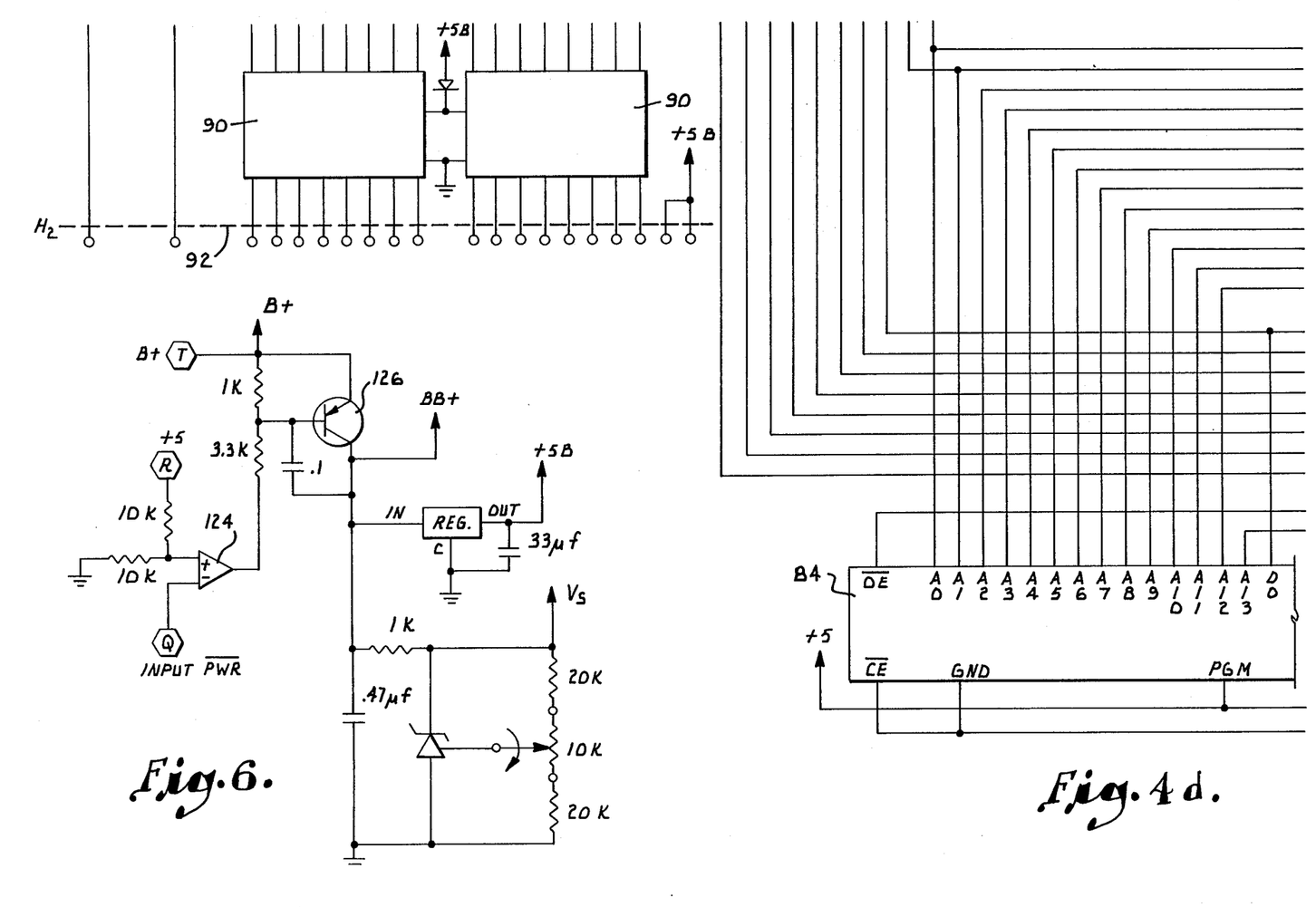
Figure 4E:
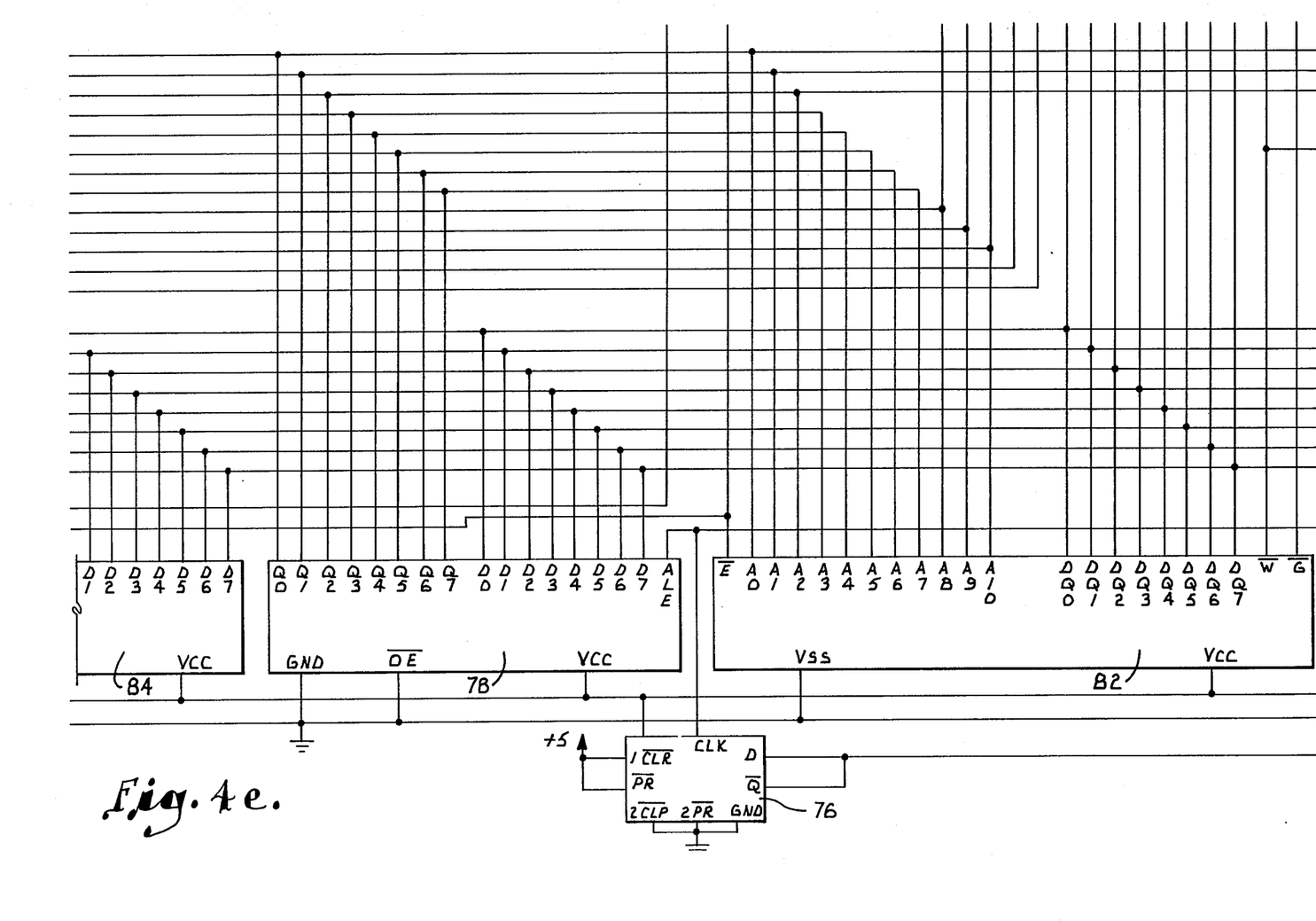
Figure 4F:
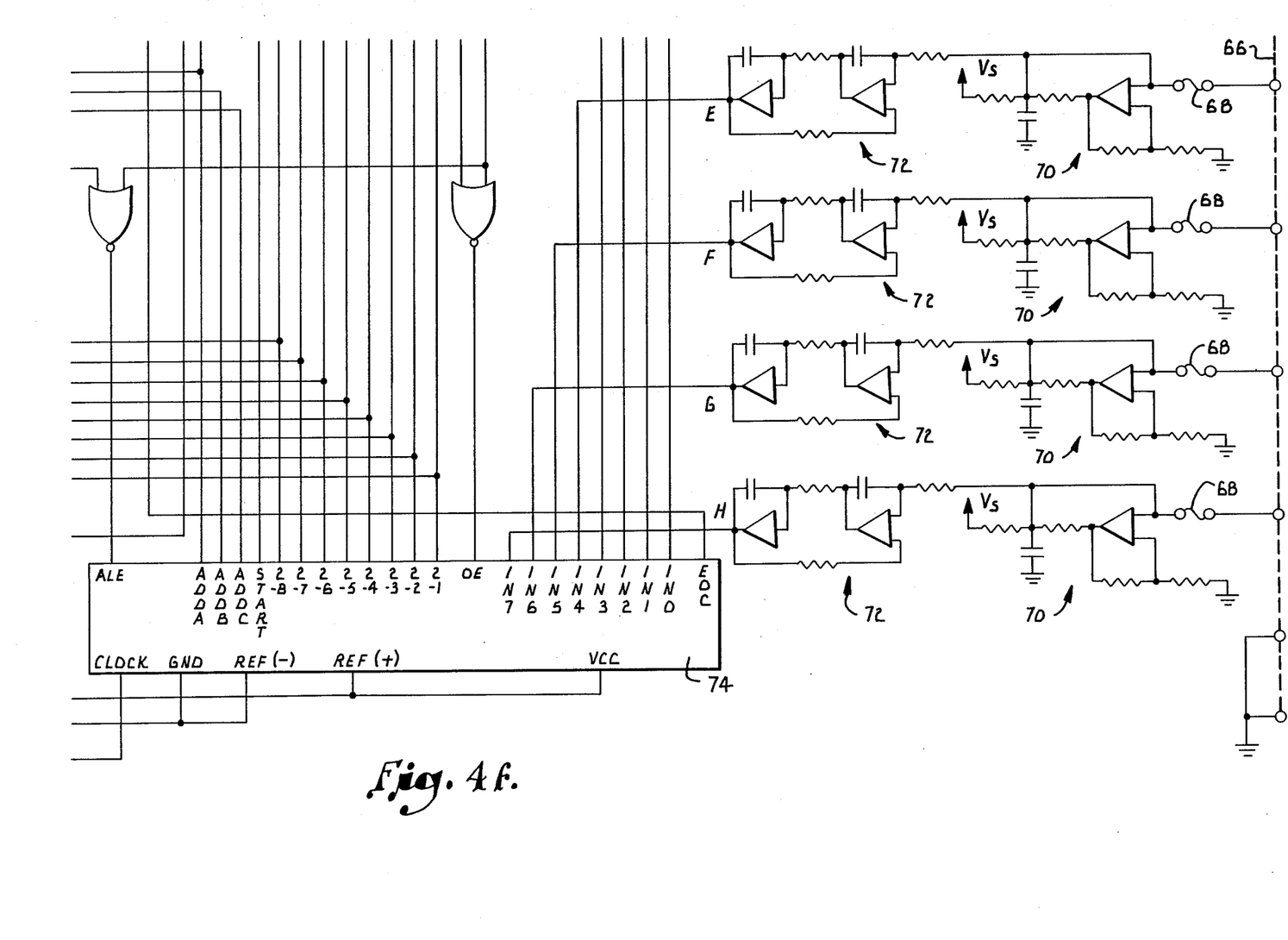

FIGS. 4a–4f illustrate schematically the circuitry of the controller 34. Referring first to FIGS. 4c and 4f, the sensor signals from the pressure transducers 28 of the various lines that are being monitored and from the probes 36 are provided to controller 34 by connecting the sensor input lines to a terminal board within the controller which is identified by the broken line indicated by numeral 66. There are preferably 8 input lines which are arranged in parallel to one another. A maximum of 4 pressure transducers can be connected to the 8 input lines, and the lines that are not connected to transducers may be connected with probes. It is possible to use no pressure transducers at all or any number between 1 and 4 pressure transducers, and this means that between 4 and 8 channels are available for use with probes. The 8 input channels are each provided with an overload protector 68 and with signal conditioning circuitry including a two to one gain buffer amplifier circuit identified generally by numeral 70 and an additional signal conditioning circuit identified by numeral 72. The output from circuits 72 are provided in parallel to an analog to digital converter circuit 74. The analog to digital converter 74 is driven by a counter 76 (FIG. 4e) which is operated as a divide by two counter. The clock line of the counter 76 is connected with the ALE pin of an address latch circuit 78 and with the ALE pin of a microprocessor 80 illustrated in FIGS. 4b and 4c.

The analog to digital converter 74 converts the analog input signals from the sensor into digital signals which are applied to the data bus of the processor. The data bus connects with the processor, with a random access memory 82 (FIG. 4e) and with a read only memory 84 (FIGS. 4d and 4e). The data bus also connects with a peripheral interface 86 shown in FIG. 4a. The interface receives signals from the keys of the key pad 60 and provides output signals to a multiplexor circuit 88 which in turn controls relay drivers 90. The relay drivers connect with terminals which are collectively indicated by the dashed line identified by numeral 92 in FIG. 4d. The terminals 92 also connect with the outputs from a pair of transistors 94 and 96 controlled by the interface circuit 86. The terminals 92 are connected with the auxiliary control unit 44 and may be used to control relays for devices such as blowers, horns and the like.

The interface circuit 86 receives up to eight additional inputs supplied on the lines labeled I-P in FIG. 4a. As illustrated with additional reference to FIG. 5, these input signals are controlled by water sensors for the probes 36 which connect with terminals collectively identified by the dashed line 98 in FIG. 5. Each probe has an associated water sensor having contacts which conduct when water is present in the corresponding monitoring well 38. Conduction of the contacts applies a signal to the corresponding input line of the terminal 98, and the input line connects through comparitor circuitry 100 with the corresponding line I-P. When conduction occurs indicating the presence of water, the corresponding input line I-P is pulled to a low state, thus indicating to the microprocessor that water is present in the corresponding monitoring well 38.

As shown in FIG. 4b, the processor 80 has an associated crystal oscillator 102 which operates at 5.5 MHz. Circuitry generally identified by numeral 104 forms a network that operates to shut down the processor if the available operating voltage is so low that the circuitry could be subjected to damage if it continued to operate. A modem connection is indicated at 108 and connects with the processor through a communications circuit 110. As will subsequently be explained, a modem can be connected to the modem connection 108 in order to provide remote communication capabilities for the system.

An audible alarm generator 112 is provided and is controlled by transistors 114 and 116 which are in turn controlled by the microprocessor 80 through an inverter 118. As will subsequently be explained, the audible alarm 112 is activated whenever an alarm condition exists. The LCD display 62 is provided by a display circuit 120 shown in FIG. 4c.

In the event of AC power loss, backup power is automatically provided by a battery B (FIG. 2) contained within the enclosure for the controller 34. FIG. 6 depicts a circuit which is used to reduce the power requirements in order to avoid quick draining of the battery voltage when the AC power is lost. The microprocessor 80 provides a $\overline{Q}$ output on line 122 when AC power is lost. This signal is applied to the inverting input of a comparitor 124 which then turns off a transistor 126 which is normally conductive. When transistor 126 is in the non-conductive state, the voltage which is available to the various components at the terminals BB+, +5B and VS is removed, and only the B+ power remains available to maintain the essential components in operation.

Figures 5, 8, 9, 10:
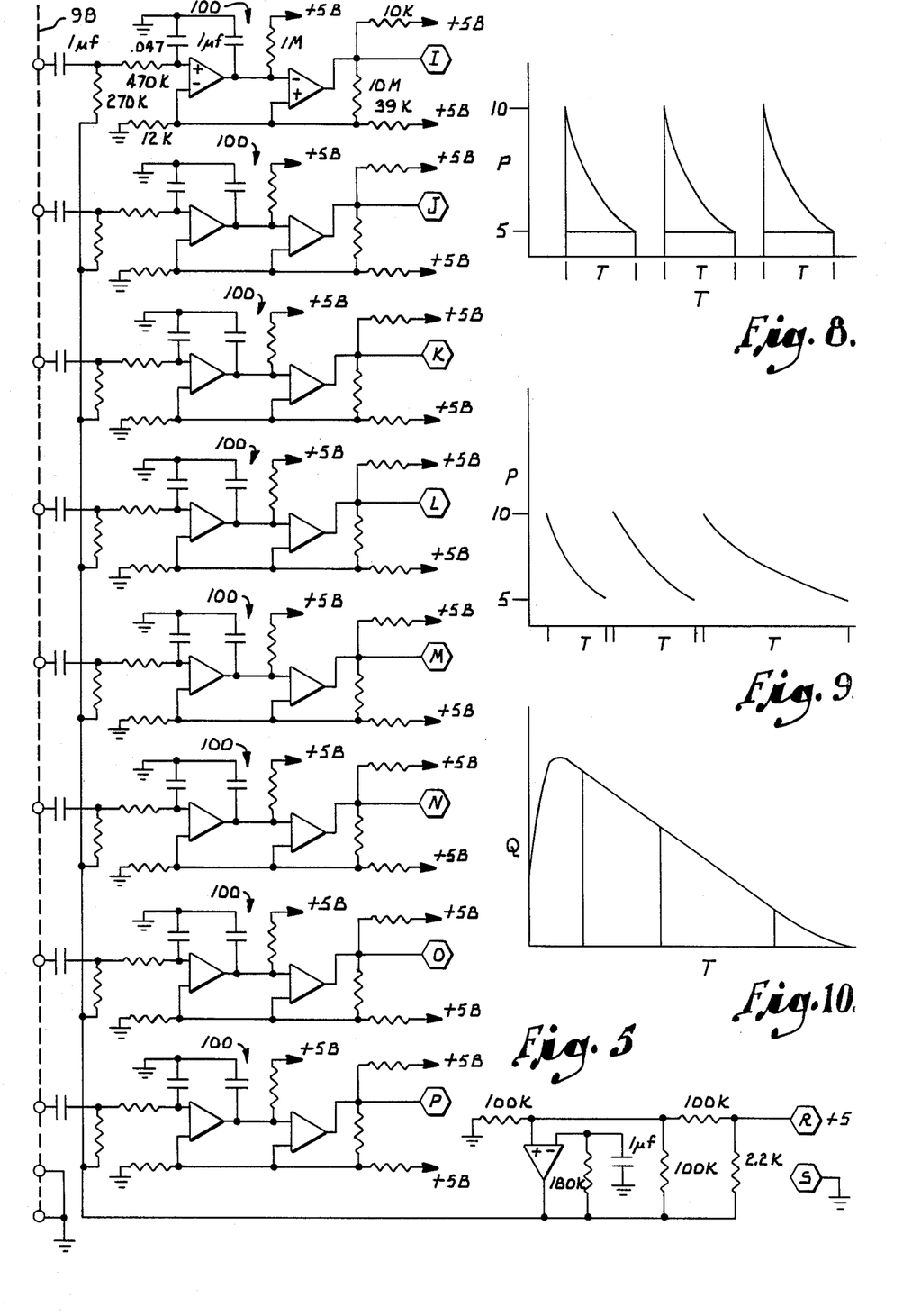
FIG. 5 is a schematic diagram of the electronic circuitry associated with the water detection input signals of the leak detector.
FIG. 8 is a graph of pressure versus time for a situation involving a leak in a pressure line.
FIG. 9 is a graph of pressure versus time for a situation involving thermal contraction in a pressure line.
FIG. 10 is a graph of the rate of volume decay in a situation involving thermal contraction.

FIGS. 8 and 9 graphically illustrate the difference between pressure drops due to a leak in the product line and due to thermal contraction. By contrasting the two graphs, it can be seen that the pressure drop due to a leak occurs identically in the same amount of time for successive time periods, whereas the time required for a given pressure drop increases with the passage of time in a thermally induced contraction. This physical fact is used in the present invention to distinguish thermal contraction from true leaks in the product line.

Figure 7:
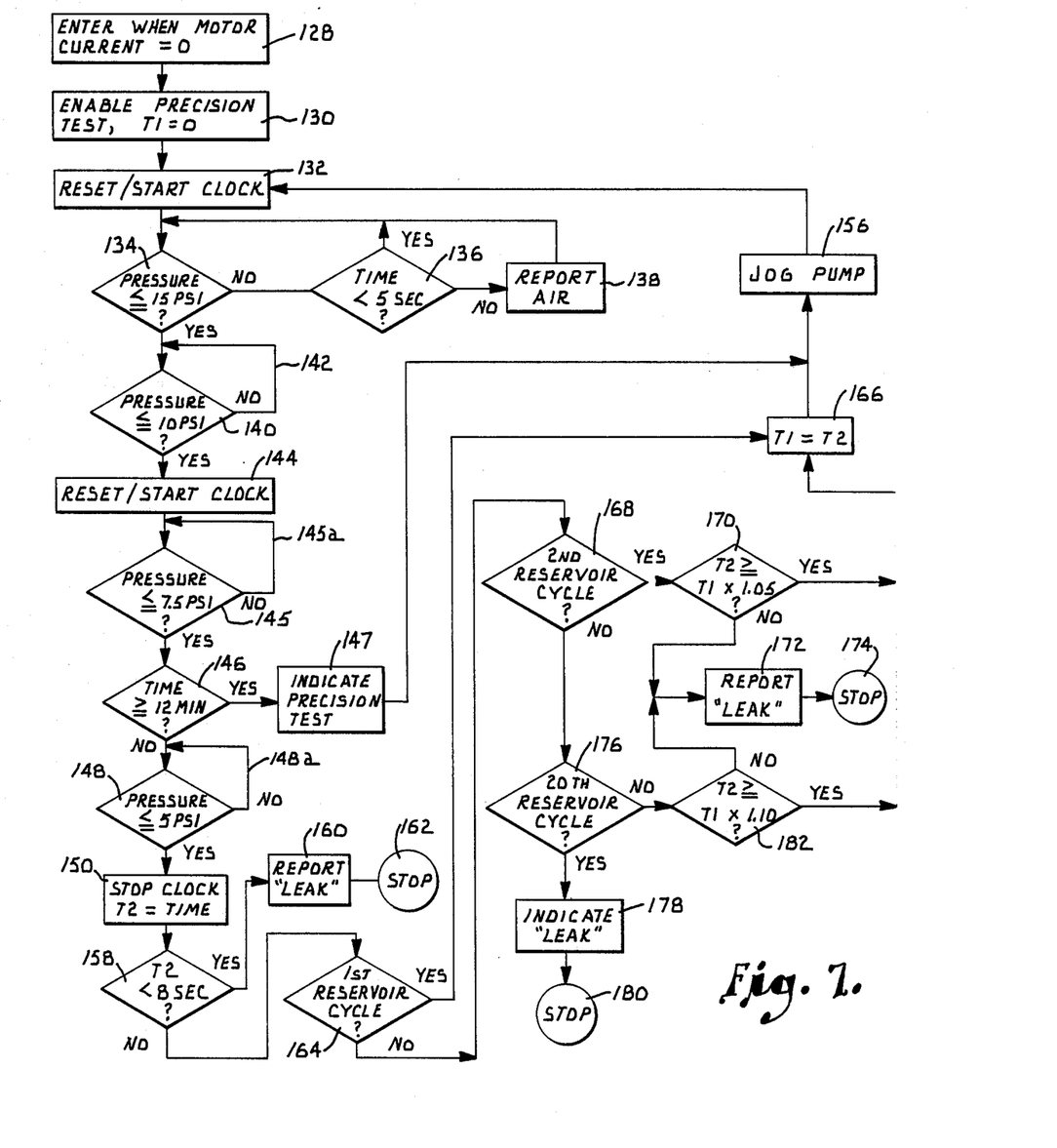
FIG. 7 is a flow chart for the programming that controls the manner in which the leak detector operates to detect leaks in the product line.

The flow chart depicted in FIG. 7 begins with the initial block 128 which is initiated as soon as the motor is deactivated (i.e., when the motor current is equal to 0). A precision test is enabled in block 130, and T1 is set equal to 0 when the clock is reset and started at block 132. At the time the motor is deenergized, the product line pressure is typically in the range of 20-35 psi. The relief valve 52 relieves the line pressure to 12 psi, and the microprocessor measures the time it takes for the pressure level in the product line 14 to decrease to the 15 psi level (or another selected level), as indicated by block 134. If the time required for the pressure in the product line to drop to 15 psi is less than 2 seconds (or some other selected time), this indicates that there is at most only a minimal amount of air in the product line, and block 136 immediately loops back to block 134. On the other and, if the time for the pressure to drop to 15 psi exceeds 2 seconds, the reason is that an excessive amount of air is present in the product line, and block 138 reports the presence of excessive air before looping back to block 134. Then, an "excessive air" indication is displayed on the display screen 62 alerting the station management to the fact that air should be purged from the piping.

If the pressure in the product line 14 does not drop to 10 psi, the system cycles continuously from block 140 through loop 142, and it is evident that there is no leakage from the product line. However, if the pressure does drop to 10 psi, the clock is reset to zero and started at block 144. If the pressure does not drop as low as 7.5 psi, the system cycles continuously from block 145 through loop 145a, and it is again evident that there is no sufficient leakage from the piping.

However, if the pressure does drop to the level of 7.5 psi, block 146 is entered and if the elapsed time during the pressure drop from 10 psi to 7.5 psi is greater than 12 minutes, the system has passed a precision leak rate test indicating that the leakage is no greater than 0.05 gallons per hour. Then, block 147 is entered to indicate that the precision test is satisfied, and the pump is turned on for 3-5 seconds to increase the line pressure and replenish the reservoir 54. As an alternative to activating the pump in the event of satisfying the precision test, the system can go to "sleep" and discontinue monitoring of the pressure. It is noted that the 7.5 psi pressure is the midpoint of the working range of the piston 57 which ejects liquid from the reservoir. Consequently, because spring 56 acts linearly, the reservoir at this time is half depleted, meaning that it has supplied one half of its total volume of 5 cubic inches as make up liquid. Since this 2.5 cubic inches is equal to 0.01 gallon and since it was supplied to the product line in 12 minutes (one fifth hour), the reservoir is supplying make up fluid at a rate of 0.05 gallon per hour. Therefore, the leakage rate does not exceed this level and the precision test is satisfied.

If the precision test is not satisfied, block 148 is entered. If the pressure is above 5 psi, the system continuously cycles from block 148 through loop 148a, and the pressure drop is insufficient to indicate leakage. However, when the pressure drops to 5 psi, the clock is stopped at block 150 and the system sets the time T2 equal to the time measured during the pressure drop from 10 psi to 5 psi. A time comparison is made in block 158, and if the pressure drop requires less than 8 seconds, it is too fast to be due to thermal contraction. Then, block 160 reports the presence of a leak and block 162 stops the pumping system from operating.

If the time measured for the pressure drop from 10 psi to 5 psi is greater than 8 seconds, block 164 is entered, and if the cycle is the first following pump shutoff, block 166 is entered and T1 is set equal to T2 (i.e., the time for the pressure drop is stored in memory). Block 156 is then entered and the pump is jogged, following which block 132 is entered again. It is noted that the reservoir 54 is filled each time the pump is activated and is depleted as the pressure drops between 11 and 4 psi to supply its contents as make up fluid to replace the volume lost during the pressure drop.

If the reservoir cycle is not the first cycle following pump shutoff, block 168 is entered. If the cycle is the second cycle following pump shutoff, block 170 is entered. There, the time for the pressure drop from 10 psi to 5 psi during the second cycle is compared with 1.05 times the time required for the pressure drop from 10 psi to 5 psi during the first cycle. If T2 is greater than T1 times 1.05, then the time required for the pressure drop during subsequent cycles is increasing fast enough that subthermal contractions is indicated. Accordingly, block 166 is entered and the pump is jogged in block 156 prior to entering block 132. Conversely, if T2 is not greater than T1 times 1.05, the time required for the pressure drop during successive cycles is not increasing fast enough to indicate that it is due to thermal contraction; instead, a leak is indicated. Therefore, block 172 is entered to report the presence of a leak and block 174 stops the pump system.

If block 168 indicates a reservoir cycle subsequent to the second, block 176 is entered. From there, block 178 is entered in the event that the reservoir cycle is the twentieth cycle. Then, a leak is indicated and the pump is disabled by entering block 180 since completion of twenty reservoir cycles with continued pressure drops is beyond the volume of a thermal contraction in the application expected.

If the cycle number is less than 20, block 182 is entered. In block 182, a calculation similar to that resulting from block 170 is made, except that the constant that is used is 1.10 in block 182 as compared to the smaller 1.05 in block 170. If the time for the pressure drop from 10 psi to 5 psi during the most recent cycle is less than 1.10 times the time required for the pressure drop during the immediately preceding cycle, the time for the pressure drop from cycle to cycle is not increasing fast enough to indicate thermal contraction, and a leak is indicated. Consequently, block 172 is entered to report a leak and the pump is disabled by block 174. On the other hand, if the time from cycle to cycle is increasing enough to provide a "yes" answer to the comparison made in block 182, thermal contraction is indicated and block 166 is entered to advance to the next reservoir cycle.

In this manner, the leak detection system measures the time required for the pressure to drop from 10 psi to 5 psi during successive reservoir cycles. If the time is increasing sufficiently from cycle to cycle to indicate that the pressure drop is due to thermal contraction (by means of the comparisons made in blocks 170 and 12), another cycle is initiated. However, if the time required for the pressure to drop from 10 psi to 5 psi from any one cycle to the next cycle is not increasing fast enough to indicate thermal contraction, the pressure drop is due to a leak. Then, blocks 172 and 174 are entered to report the presence of a leak and disable the pump.

It is noted that a smaller number (1.05) is used to compare the first and second reservoir cycles than the number (1.10) which is used to compare all subsequent cycles. The reason for this is that, as shown in FIG. 10, a peak in the leak rate of a system of the expected size occurs during the first time interval as the temperature gradient that is initially established at the pipe wall propogates inwardly and stabilizes. This physical fact results in the possibility of introducing error unless a number relatively close to one is used as a multiplication factor for the comparison between the first and second cycles. Consequently, the number 1.05 (which is closer to 1 than the number 1.10) is selected as the multiplier for the comparison that is made between the first and second reservoir cycles. Subsequent cycles can be compared through use of a larger multiplication factor without error.

The provision of the reservoir 54 and the manner in which it acts to store liquid and supply it to the product line to make up for volume contractions permits the system to determine how much volume loss occurs. Each time the pressure drops and the reservoir is substantially depleted, the reservoir applies a known volume to the product line which replaces the volume that has been lost. The reservoir is filled again each time the pump is activated to increase the product line pressure.

In operation of the leak detection system, a threshold hydrocarbon concentration which is considered to be indicative of a leak is assigned to each of the probes 36. It is noteworthy that each probe can be assigned a different threshold concentration level, since it is often desirable for the different probes to operate at different threshold concentration levels. Local peculiarities such as background hydrocarbon levels and the restrictions imposed by local ordinances can be taken into account in programming the threshold levels of the probes.

Programming of the controller 34 is carried out by sliding the program switch 64 to the "program" position. The various functions can then be programmed successively, with the "next" key on the key pad being pressed between the different functions. For example, a location or identification number can be programmed, a telephone number can be programmed in order to cause it to be automatically dialed either periodically or in the event of an alarm condition, and the month, day, year and time can be programmed. The time of the automatic dialing can be programmed, up to four of the eight available monitoring channels can be selected for monitoring the pressure in four different product lines, and one or more of the remaining channels (which are probe channels) can be individually and independently programmed with the same or a different hydrocarbon threshold level (in parts per million). After the unit has been programmed, the program switch 64 is returned to the "run" position.

Certain program selections can also be made to determine the action taken in the event of an alarm condition. For example, selection can be made as to the number of minutes a pump will be disabled in the event of an alarm condition. Alternatively, by entering a 0 for this function, the pump can be disabled until the condition that caused the alarm has been corrected and the system has been reset. In addition, if an alarm condition is generated, the station management can elect to not disable the pumps but merely to provide an alarm signal. As another alternative, only the pump associated with the channel for the probe 36 which generates the alarm condition can be disabled, while the remaining pumps remain in active condition. Finally, it is possible to program the unit such that all pump channels are disabled in the event of an alarm condition sensed at any of the probes.

When the program switch 64 is in the "run" position, the display screen 62 can be cycled by pressing the "scan" key on the key pad 60. The various functions which have been programmed into the unit will then be displayed in succession to verify the programming and to provide the current status of each monitored location (displayed in psi for each product line 14 and sensed hydrocarbon level in parts per million with respect to each probe 36).

If there is no alarm condition detected by any of the sensors, the display screen 62 continuously provides a readout of the time, date and the phrase "status OK" to indicate the absence of an alarm condition. In the event of an alarm condition, the microprocessor activates the audible alarm generator 112 to produce an audible alarm signal, and the LCD display 62 displays the time, date and the phrase "alarm-press scan" to provide a visual indication that the system is in alarm. The "quiet" key on the key pad 60 may be pressed to silence the audible alarm.

When an alarm condition arises, the "scan" key should be pressed to cycle through the display in order to determine which channel is in alarm and the exact location of the alarm. For example, if the second pressure transducer 28 senses a leak in the associated product line 14, when the number 2 line leak detector position is reached on the display, the display will indicate that that transducer is in an alarm condition. If one of the probes 36 senses a hydrocarbon level in excess of the programmed threshold level, then the probe will be in alarm and a visual identification of the probe number and its alarm status will be given when the probe position is reached on the display screen 62.

The unit also enters into memory any prior alarms, and these can be called up on the display screen during cycling of the display. When the display is cycled, it reaches the "prior alarms" position, and then the time, date, and numerical identification of the component or components sensing the alarm condition are displayed on the LCD display. In addition, the programmed telephone number will be automatically dialed to provide to the corresponding telephone station information as to the alarm condition. The selected telephone number will also be automatically dialed every 24 hours (if so programmed) in order to provide an up to date status report to a remote location at a preselected time each day.

It is thus apparent that the present invention provides a system which accurately and reliably detects leaks both from the underground fuel storage tank 10 and from the product line 14 which supplies the fuel from the tank to the above ground dispenser 16. The unique manner in which the leak detection system distinguishes thermally induced pressure drops from pressure drops due to true leaks allows it to detect leaks in the piping system more reliably than has been possible in the past. At the same time, leakage from the tank 10 can be monitored by the probes 36, each of which can be individually and independently assigned a different threshold hydrocarbon concentration which is indicative of a leak sensed at the particular location of the probe. This versatility greatly enhances the capability of the system to operate reliably in different environments and under different conditions.

It is contemplated that the system can be used with a number of pressure transducers 28 and probes 36 on the different channels that are included in the system. However, it should be noted that only pressure monitoring of the product line 14 can be used in some instances, whereas the system can also be used with only probes 36. It is anticipated that commercial embodiments of the invention will be made available both with the capability of combining line leak detection and tank leak detection and also with only the capability of detecting tank leakage.

If one or more pumps are to be disabled in the event of an alarm condition, this is accomplished by disabling the authorization relay in the auxiliary control unit 44. The pump motor is then disabled by the auxiliary control unit 44 operating through the pump motor relay box 26.

If AC power is lost, the system automatically goes into a low power operating mode in which monitoring and data collection are terminated so that battery power can be conserved and devoted wholly to retaining collected data. The system can operate in the low power mode for about 36 hours.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A method of detecting leakage from a product line through which liquid is pumped and in which the liquid is subject to possible thermally induced contraction, said method comprising the steps of:
   monitoring the pressure in the product line;
   measuring the time required for the produce line pressure to drop from one preselected pressure level to a lower preselected pressure level during a first cycle;
   raising the pressure in the product line from said lower preselected pressure level to a level at least as high as said one preselected pressure level;
   measuring the time required for the product line pressure to drop from said one preselected pressure level to said lower preselected pressure level during a second cycle; and
   interpreting the drops in pressure as resulting from a leak in the product line unless the time measured during said second cycle exceeds the time measured during first cycle by a predetermined amount.

2. The method of claim 1, including the step of interpreting the pressure drop during said first cycle as resulting from a leak in the product line if the time measured during said first cycle is less than a preselected time.

3. The method of claim 2, including the step of giving an alarm signal in response to an interpretation of a leak in the product line.

4. The method of claim 1, including the steps of:

relieving the pressure in the product line to said one pressure level following said raising step;

measuring the time required to relieve the pressure in the product line to said one level; and indicating the presence of air in the product line in excess of an established permissible amount if the time required to relieve the pressure exceeds a predetermined value.

5. A method of detecting leakage from a liquid fuel product line through which the fuel is pumped from a storage tank to a dispenser, said method comprising the steps of:

monitoring the pressure in the product line;

relieving the pressure in the product line to a predetermined level whenever the pressure therein is above said level and fuel is not being pumped into the product line;

effecting sequential pressurization cycles each including pumping fuel into the product line to raise the pressure therein above said predetermined level when the pressure in the product line drops to a lower level;

measuring the time required during each cycle for the pressure in the product line to drop from said predetermined level to said lower level; and providing a leak indication whenever the time measured during any cycle exceeds the time measured during the immediately preceding cycle by less than a predetermined amount.

6. The method of claim 5, including the step of providing a leak indication if the time measured during any cycle is less than a predetermined value.

7. The method of claim 5, including the steps of:

measuring the time required during each cycle for relief of the pressure in the product line to said predetermined level from said pressure above said predetermined level; and providing an indication of excessive air in the product line if the time required for relief of the pressure in the product line exceeds a predetermined value.

8. The method of claim 5, including the step of visually displaying the product line pressure which is monitored.

9. The method of claim 5, wherein said predetermined amount is less for a comparison of the time measured during the first and second cycles than for the comparisons of the time measured during other successive cycles.

10. The method of claim 5, including the step of recording when the time measured during any cycle exceeds a preselected value indicative of a precision leakage test.

11. A method of detecting the presence of an amount of gas in excess of an established permissible amount in a system containing liquid which is pressurized, said method comprising the steps of:

applying pressure to the system to raise the pressure therein to a high level;

relieving the pressure in the system to a predetermined low level less than said high level;

measuring the time required for the pressure relief to effect dropping of the pressure in the system from said high level to said low level; and providing an indication of an amount of gas in the system in excess of said established permissible amount if the time that is measured exceeds a preselected value.

12. A method of detecting the presence of air in excess of an established permissible amount in an automotive fuel product line through which fuel is pumped from a storage tank to a dispenser, said method comprising the steps of:

pumping fuel from the tank into the product line to elevate the pressure therein above a predetermined level;

relieving the pressure in the product line to said predetermined level;

measuring the time required for the product line pressure to be relieved to said predetermined level; and providing an indication of air in the product line in excess of an established permissible amount when the time that is measured exceeds a preselected value.

13. A method of monitoring leakage of automotive fuel from an underground storage tank in a service station, said method comprising the steps of:

providing a plurality of monitoring wells at preselected spaced apart locations in proximity to the tank;

installing in each monitoring well a probe which is sensitive to hydrocarbon concentration and which provides an electrical signal indicative of the hydrocarbon concentration sensed by the probe;

using said electrical signal from each probe to provide a digital display of the hydrocarbon concentration sensed by each probe;

assigning independently to each probe a preselected hydrocarbon concentration which is indicative of leakage of gasoline from the tank and which is independent of the preselected hydrocarbon concentration assigned to other probes;

detecting when the hydrocarbon concentration sensed by each probe exceeds the preselected concentration assigned thereto as being indicative of leakage of gasoline from the tank; and providing an alarm signal when any probe senses a hydrocarbon concentration in excess of the preselected concentration assigned thereto.

14. Apparatus for detecting the presence of air in excess of an established permissible amount in an automotive fuel product line through which liquid fuel is pumped by a pump from an underground storage tank to a fuel dispenser, said apparatus comprising:

means for activating said pump to pump fuel from the tank into the product line to raise the pressure therein above a predetermined level and then deactivating the pump;

a pressure relief valve operable to relieve the pressure in the product line to said predetermined level whenever the pressure in the product line exceeds said predetermined level;

means for measuring the time required for the pressure in the product line to drop to said predetermined level each time the pump is deactivated following activation thereof; and means for providing an indication of air in the product line in excess of an established permissible amount whenever the time measure by said measuring means exceeds a preselected value.

15. Apparatus for detecting leakage from an underground automotive fuel storage tank and from a fuel product line through which fuel is pumped from the tank to a fuel dispenser by a submersible pump, said apparatus comprising:

a plurality of hydrocarbon sensitive probes spaced around the tank, each probe providing an electrical signal indicative of the hydrocarbon concentration sensed by the probe;

means for assigning independently to each probe a preselected threshold concentration level which is indicative of leakage from the tank and which is independent of the threshold levels assigned to other probes;

means for sensing the pressure in the product line;

means for using the sensed pressure in the product line to detect when there is leakage therefrom above a predetermined rate;

an above ground display screen;

means for displaying on said screen the sensed pressure in the product line and a numerical indication of the hydrocarbon concentration sensed by each probe; and means for generating an alarm signal if leakage from the product line above said predetermined rate is detected or if the hydrocarbon concentration sensed by any probe exceeds the preselected threshold level assigned thereto.

16. Apparatus for detecting leakage in a liquid delivery system having a pump for intermittently pumping liquid through a product line in which the liquid is subject to possible thermally induced contraction, said apparatus comprising:

means for sensing the pressure in the produce line;

pressure relief means connected with the product line for relieving the pressure therein to a first preselected level when the product line pressure is above said first preselected level and the pump is deactivated;

means for activating the pump for a pumping cycle effective to elevate the product line pressure above said first preselected level each time the pressure therein has dropped to a second preselected level lower than said first level;

means for measuring the time required for the product line pressure to drop from said first level to said second level following the end of each pumping cycle; and means for indicating leakage in the product line if the time measured following the end of any pumping cycle does not exceed the time measured following the end of the immediately preceding pumping cycle by a predetermined amount.

17. Apparatus as set forth in claim 16, including means for disabling the pump if the time measured following the end of any pumping cycle does not exceed the time measured following the end of the immediately preceding pumping cycle by said predetermined amount.

18. Apparatus as set forth in claim 16, including means for indicating leakage in the product line if the time measured following the end of any pumping cycle is less than a predetermined time.

19. Apparatus as set forth in claim 16, including means for reporting excessive air in the product line if the time required for the product line pressure to drop to said first level exceeds a predetermined time.

20. Apparatus as set forth in claim 16, including means for digitally displaying the pressure in the product line sensed by said sensing means.

21. Apparatus as set forth in claim 16, including:

a below ground storage tank containing liquid fuel to be pumped through the product line;

a below ground monitoring well in proximity to the tank;

a probe in said well operable to sense the presence of hydrocarbons and provide an electrical signal indicative of the amount of hydrocarbon sensed by the probe; and means for digitally displaying the amount of hydrocarbon sensed by the probe.

22. Apparatus as set forth in claim 21, including means for providing an alarm signal if the amount of hydrocarbon sensed by the probe exceeds a preselected level indicative of a leak from the tank.

23. Apparatus as set forth in claim 21, including means for recording the time when the amount of hydrocarbon sensed by the probe exceeds a preselected level indicative of a leak from the tank; and means for indicating that the amount of hydrocarbon sensed by the probe exceeds said preselected level.

24. Apparatus as set forth in claim 23, including means for adjusting said preselected levels.

25. Apparatus as set forth in claim 16, including:

a variable volume reservoir connected with the product line to receive liquid therefrom; and yieldable means for urging the liquid in said reservoir into the product line when the product line pressure is below a predetermined level which said yieldable means can overcome.

26. Apparatus for monitoring leakage of automotive fuel from an underground storage tank in a service station, said apparatus comprising:

a plurality of hydrocarbon sensitive probes spaced apart from one another in proximity to the tank and each operable to sense the hydrocarbon concentration and to provide an electrical signal indicative of the hydrocarbon concentration sensed by the probe;

an above ground display screen for displaying the hydrocarbon concentration sensed by each of said probes;

means for processing said electrical signals from the probes and displaying on said screen an identification of each probe and the hydrocarbon concentration sensed thereby;

means for assigning independently to each probe a threshold hydrocarbon concentration which is indicative of leakage from the tank and which is independent of the threshold concentration assigned to other probes; and means for providing an alarm signal in the event that the hydrocarbon concentration sensed by any probe exceeds the threshold concentration assigned thereto.

27. Apparatus as set forth in claim 26, including means for displaying the identification of each probe which senses a hydrocarbon concentration above the threshold concentration assigned thereto.

28. Apparatus as set forth in claim 26, including:

means for recording and storing the time of each instance when one of the probes senses a hydrocarbon concentration above the threshold concentration assigned thereto; and means for displaying the identification of each probe associated with each such instance.

29. Apparatus as set forth in claim 26, including:

means for serially scanning said probes; and means operable in response to said scanning for serially displaying the identity of each probe and the hydrocarbon concentration sensed thereby.

30. Apparatus as set forth in claim 15, including means for displaying an identification of each probe which senses a hydrocarbon concentration above the threshold level assigned thereto.

31. An apparatus as set forth in claim 15, including:
means for recording and storing the time of each instance when one of the probes senses a hydrocarbon concentration above the threshold concentration level assigned thereto; and
means for displaying the identification of each probe and the time of each such instance for the probe.

32. Apparatus as set forth in claim 15, including means for disabling the pump when leakage from the product line is detected above said predetermined rate.

* * * * *